Jan. 15, 1952     A. J. FOLLI     2,582,245
SERVICE DISH FOR FRUITS
Filed Oct. 11, 1948
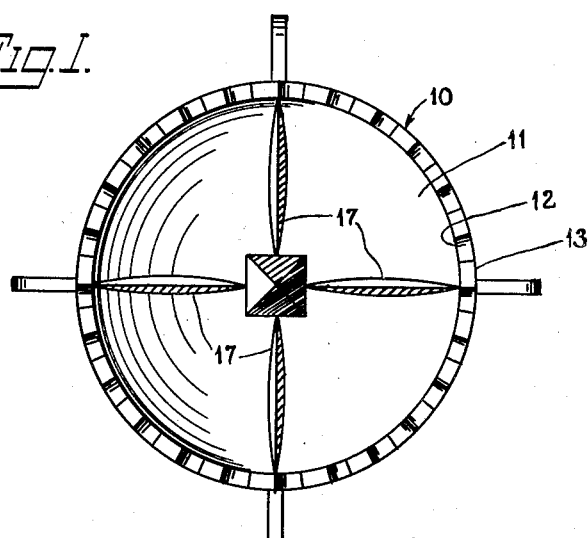
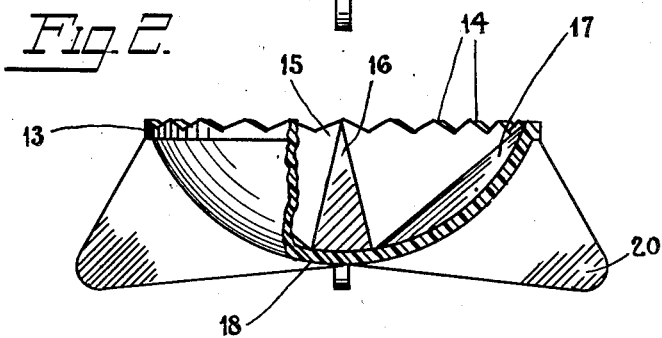
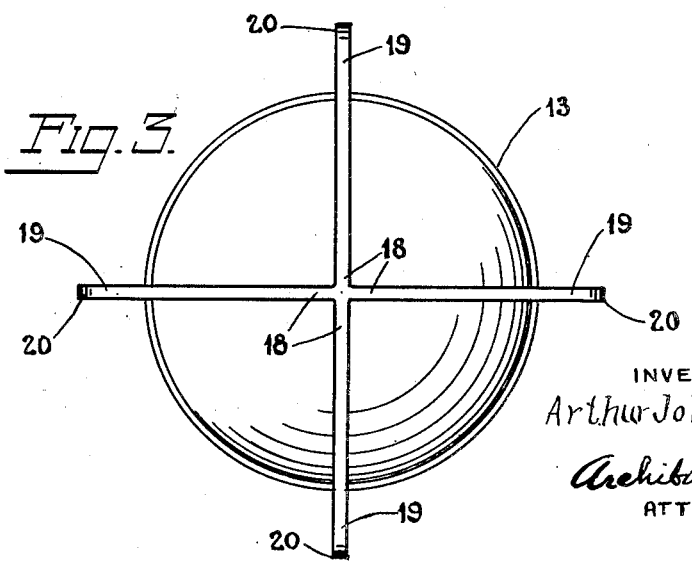
INVENTOR
Arthur John Folli
Archibald D. McKella
ATTORNEY Patented Jan. 15, 1952

2,582,245

UNITED STATES PATENT OFFICE 2,582,245

SERVICE DISH FOR FRUIT

Arthur John Folli, Chicago, Ill.

Application October 11, 1948, Serial No. 53,830

3 Claims. (Cl. 169—15)

The invention relates to dishes used in serving food, but more particularly to dishes adapted to be used in dispensing fruits such as small melons, grapefruit or the like, particularly when served in halves of approximately semi-globular form, but more particularly to a dish of this character which is provided with means for engaging the fruit against relative movement when positioned therein; and has for its objects the provision of a dish of this character which will be simple of construction, economical to manufacture, and highly efficient in use.

Other objects will appear hereinafter.

The invention consists in the combinations and arrangements of parts hereinafter described and claimed.

The invention will be best understood by reference to the accompanying drawings forming a part of this specification, and in which—

Fig. 1 is a top plan view of a service dish embodying the invention;

Fig. 2 is a side view of Fig. 1 partially in half-section; and

Fig. 3 is a bottom plan view of Fig. 1.

The embodiment of the invention illustrated in the drawings comprises a dish 10 constructed of a suitable moldable plastic having an approximately semi-globular basin 11 in its upper side with a circumferential wall 12 of substantially even thickness from its brim 13 downwardly. The upper edge of the brim 13 is provided with a plurality of upwardly projecting angularly pointed teeth 14 having inner faces 15 flush with the inner surface of the basin 11. A stud 16 is arranged centrally in the bottom of the basin 11 which is pyramidal in shape having it apex arranged substantially in line with the uppermost edges of the teeth 14. The inner surface of the basin is provided with a plurality of radiating ribs 17 extending upwardly and outwardly from the base 18 of the stud 16 to the upper edge of a selected tooth as best shown in Fig. 1.

The outside of the basin 11 is provided with four downwardly and outwardly extending leg flanges 19 of even thickness arranged and adapted to rest on their outermost ends 20, on a suitable flat surface such as a table or the like, the flanges being arranged substantially at right angles in vertical alignment.

It is to be noted that while the basin has been made semi-globular this may, if desired, be made with a conventional cup-shaped bottom and the leg flanges 19 dispensed with. It is, however, advisable that a rather closely fitting wall be adopted when used for grape fruit. In some fruits such as small melons, it is advisable that the stud 16 of a lesser height be used.

The arrangement of a half a grape fruit, or the like, is that the fruit be pressed into the basin 11 firmly until the stud 16 has pierced the outer skin and the upper ends of the teeth are partially embedded therein.

The dish is a simple and effective one for the purpose enabling the diner to avoid unpleasant and annoying incidents while in use.

While I have illustrated and described my invention in detail, this is capable of variations and modifications in the arrangement and alterations of parts without departing from the invention. I therefore do not wish to be limited to the precise details set forth but desire to avail myself of such form or forms as may fall within the spirit and scope of the appended claims.

I claim:

1. In combination with a bowl having a wall of even thickness provided with an inner surface substantially defining a hemi-spherical cavity; a plurality of inverted V-shaped teeth having their apexes in radial alignment spaced consecutively in concentric arrangement on the upper edge of said wall of even thickness; a quadrangular pyramidal stud formed integrally within said cavity and extending upwardly to the plane of the apexes of said teeth; a plurality of upwardly and outwardly projecting ribs of inverted V-shaped cross section, each rib extending from a side of said pyramidal stud and terminating at the plane of the apexes of said teeth; a plurality of leg flanges extending outwardly and downwardly from the outer surface of said wall of even thickness, each of said flanges arranged in radial alignment with its respective rib within said cavity.

2. In combination with a bowl having an inner wall substantially defining a hemi-spherical cavity; a stud having triangular faces arranged vertically within said inner wall; an inverted V-shaped rib extended outwardly and upwardly from each triangular face to the upper edge of said wall; the apex of said triangular face, and the upper end of the inverted V-shaped rib terminating at the plane of the upper marginal edge of the wall defining said hemi-spherical cavity.

3. In combination, a vessel of integral construction comprising a body having a wall forming a substantially hemi-spherical cavity; a plurality of inwardly projecting V-shaped ribs in spaced alignment extending downwardly and inwardly from substantially the marginal edge of said wall; and three or more leg flanges extending downwardly and outwardly from the outer surface of said body, each of said leg flanges in radial alignment with an inwardly projecting V-shaped rib.

ARTHUR JOHN FOLLI.

REFERENCES CITED

The following references are of record in the file of this patent:

UNITED STATES PATENTS

| Number | Name | Date |
|---|---|---|
| 521,613 | Hiller | June 19, 1894 |
| 524,645 | McAusland | Aug. 14, 1894 |
| 527,999 | Leach | Oct. 23, 1894 |
| 1,200,990 | Rooney | Oct. 10, 1916 |
| 1,921,348 | Cullen | Aug. 8, 1933 |
| 2,128,371 | Lumpkin | Aug. 30, 1938 |

FOREIGN PATENTS

| Number | Country | Date |
|---|---|---|
| 5,735 | Great Britain | Mar. 23, 1891 |
| 400,056 | Great Britain | Oct. 19, 1933 |